United States Patent [19]

Nopper et al.

[11] Patent Number: 4,818,829
[45] Date of Patent: Apr. 4, 1989

[54] INTEGRALLY MOLDED COMPOSITES OF SILICONE RUBBER

[75] Inventors: Leroy N. Nopper, Irvine; Meryl E. Miller, Rancho Palos Verdes, both of Calif.

[73] Assignee: Duralith Corporation, Millville, N.J.

[21] Appl. No.: 71,410

[22] Filed: Jul. 9, 1987

[51] Int. Cl.[4] ............... H01H 13/70; B20C 17/22
[52] U.S. Cl. ........................... 200/512; 200/5 A; 264/247; 264/261
[58] Field of Search ............ 200/159 B, 340, 314, 200/5 A; 264/246, 247, 261, 265, 275, 279, 279.1, DIG. 64

[56] References Cited

U.S. PATENT DOCUMENTS

| | | |
|---|---|---|
| 4,446,192 | 5/1984 | Dehlén ........................ 264/261 |
| 4,464,326 | 8/1984 | Nishihira .................... 264/246 |
| 4,634,818 | 1/1987 | Hayes-Parkhurst et al. ... 200/159 B |

OTHER PUBLICATIONS

Johnson, Jr., D. O., *Keyboard and Wiping Contact Assembly*, IBM Tech. Disclosure, vol. 13, No. 7, p. 1962--Dec. 1970.

*Primary Examiner*—Renee S. Luebke
*Attorney, Agent, or Firm*—Nixon & Vanderhye

[57] ABSTRACT

Novel composite products formed by bonding a flowable elastomer, such as silicone rubber, to a transparent or translucent silicone rubber preform are described. These products have utility in the field of electromechanical devices such as an illuminated switch or key or as a transparent rubber window permitting view of an underlying display device. The bond between the preformed elastomer and the flowable elastomeric material is improved by post-curing the preform for about 4 hours at about 200° C. prior to contact of the flowable material with the preform. Methods of fabrication of the novel composites are also disclosed.

12 Claims, 2 Drawing Sheets

INTEGRALLY MOLDED COMPOSITES OF SILICONE RUBBER

BACKGROUND OF THE INVENTION

1. Field of the Invention

The desirability of forming composite materials into an integral unit has been a long-standing problem in the art.

It is of course desirable to form composite products for many reasons, i.e., to enjoy the benefits that each material contributes to the composite, to surround or imbed a relatively expensive material in a holder or carrier of less expensive material, to provide decorative or functional features in a composite material which are delineated by different colors, hardnesses, or other physical or chemical characteristics and the like.

In order to satisfy the need for composite products the prior art has resorted to various methods of manufacturing such composites. These attempts include the separate forming of the individual elements and assembly into a composite by means of an adhesive or mechanical fastener. This technique is relatively labor intensive requiring the skill of an operator to align the preformed elements in the position desired in the final composite.

With the advent of moldable materials it became possible to co-mold, either sequentially or simultaneously, various layers or parts of a composite product. It also became possible to place preformed molded parts or elements in a mold cavity and cast or injection mold flowable material about the elements so as to form a composite product. Although such techniques are generally known in the molding art, there are considerable disadvantages to forming composite products by the known molding techniques.

Placement and retention of the preform elements in a precise location in the mold cavity requires the use of projecting pins or depressions to retain the preformed elements in their desired position during the molding process. Such positioning means increases the cost of mold fabrication. Additionally the known positioning means are not sufficient to prevent "flash" or a "skin" of flowable material from penetrating between the preform and mold surface resulting in a defective composite product.

In the case of forming elastomers, such as silicone rubbers into a composite product, it would have been expected that the placement of a preformed insert, which is only partially cured into a mold and flowing a moldable material thereagainst would improve the bond strength between the preformed elastomer and the flowable material. This expectation is based in part on the theory that the partially cured elastomer would still contain sites which could cross-link with the flowable elastomer. However, in practice the use of partially cured elastomers as the preform does not result in a satisfactory bond with the flowable elastomer even though the composite material may may be fully post-cured out of the mold.

Furthermore, incompatibility of the various elements of the composite product may make adherence of the elements at their interface difficult or impossible to achieve even in the mold. Vapors entrapped in the preform or generated during contact of the molten material with the preform can deteriorate the strength of the "weld" or "bond" at the interface of the materials. Some incompatible materials can be improved by the use of an adhesive or primer on the preform to increase the adhesion of the elements. In order to assure adherence of preforms to the molded material, the prior art has also resorted to the use of mechanical means, such as projections or undercut depressions so as to provide a "mechanical interlock" between the preform and molded material. Although improving the strength between the individual elements in the composite, the provision of mechanical interlocks, primer and/or adhesive applications on the preformed elements increases the cost of production of the composite. Thus these prior art attempts to make composite products have not proved to be entirely satisfactory.

OBJECT OF THE INVENTION

It is an object of the invention to overcome the deficiencies of the prior art noted hereinabove in the manufacture of composite products.

It is another object of the invention to produce a composite product wherein at least a portion of the product comprises a "light-transmitting" element such as translucent or transparent preform at least partially surrounded by an opaque material.

It is a further object of the invention to produce composite products by vulcanizing a flowable material of one color onto a preform of a different color.

In another embodiment of the invention it is an object to increase the bond strength at the interface of a preformed element of a composite product by post-curing the preformed portions of the composite product prior to contacting the preformed portions with a flowable material.

It is a further object of the invention to provide novel processes of forming composite products.

These and other objects of the invention will be better understood by reference to the following description of the invention.

DETAILED DESCRIPTION OF THE INVENTION

Figure 1:
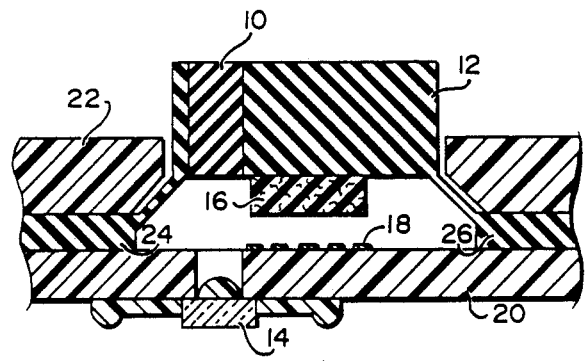
FIG. 1 illustrates a side section view of a composite product according to one embodiment of the invention.

It is desirable to produce composite products wherein a portion of the composite includes an element which possesses light-transmitting properties with the remainder of the composite comprising an opaque material. Such composite products can be used as a switch or key in various electromechanical devices. In FIG. 1 is illustrated a composite product according to the present invention wherein 10 is a translucent light-pipe and 12 is an opaque key. Such a composite product has utility in an electromechanical switch wherein an indicator such as light, emitted from light-emitting diode 14 passes through the translucent light-pipe 10 thereby giving a visual signal to an operator for operating key 12. A strip of conductive rubber 16 provides a shorting contact when it engages printed circuit (PC) contacts 18 located on the PC board 20. A bezel 22 locates and retains the extensions 24, 26 of the opaque key adjacent PC board 20. Thus the invention provides a composite key capable of performing multi-functions including transmission of light through the surface of key 12.

Figure 2:
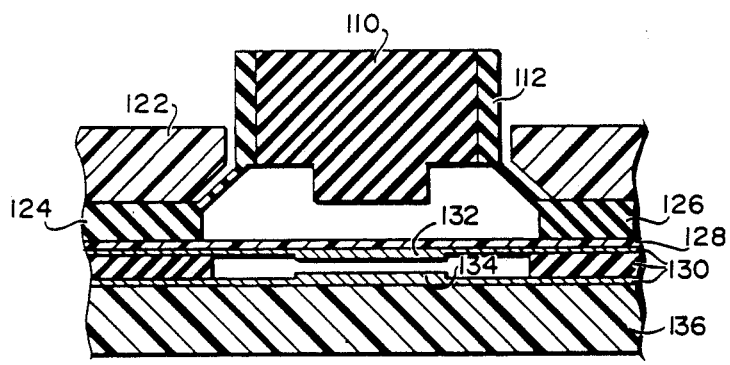
FIG. 2 is a side section view illustrating a further embodiment of the invention.

In FIG. 2 is shown another embodiment of the invention wherein the composite product comprises a translucent member 110 which is surrounded by an opaque key 112. Light from an electroluminescent lamp 128 is transmitted through the translucent member 110 to visually signal an operator. Upon depression of key 112 a membrane switch 130 will bring upper membrane switch contacts 132 into electrical engagement with lower membrane switch contacts 134. A bezel 122 is utilized to locate and position the key extensions 124 and 126 in relation to the rigid supporting plate 136.

Figure 3:
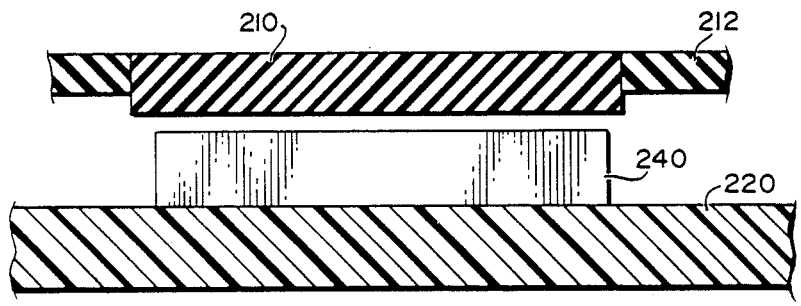
FIG. 3 is a side section view of another embodiment of the invention.

In a further embodiment of the invention as illustrated in FIG. 3 there is disclosed a composite product including a transparent window 210 which is integral with an opaque frame 212. The transparent window overlies a display device 240 supported by PC board 220.

It should be appreciated from the foregoing disclosure that the present invention can provide composite products having various utilities which utilize the properties of each of the elements of the composite in an efficient and economical fashion.

Figure 4:
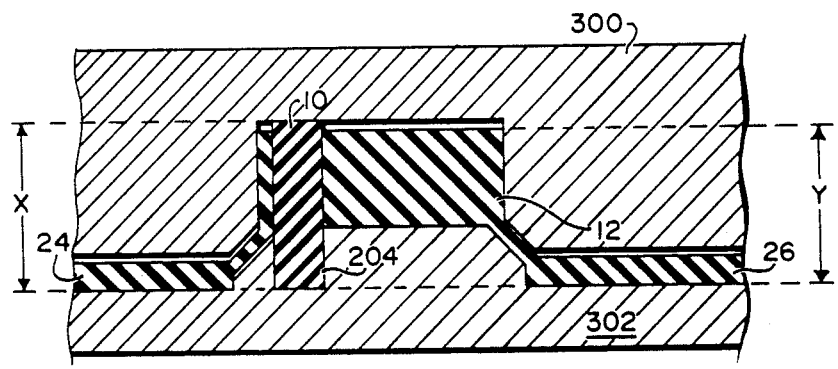
FIG. 4 is a sectional view through an injection mold containing a preform and moldable material.

A method of manufacturing the composite element of FIG. 1 will now be described in connection with the description of FIG. 4. Like elements in FIG. 1 and 4 will be similarly numbered. An upper mold element 300 and lower mold element 302 form a two-part split mold defining a mold cavity portion when upper mold part 300 is assembled to lower mold part 302. A preformed translucent light-pipe 10 is placed in the mold cavity by an operator or by mechanical means prior to closing the mold parts 300 and 302. This preformed light-pipe 10 is preferably formed of an elastomer such as silicone rubber. Silicon rubber is a well known material, per se, and is known for its anti-stick properties. Silicon rubber has thus been used for taking impressions of patterns or models, and is used as a mold or mold lining because it adheres to neither the patterns or molded parts. The present inventors have found that a commercially available silicone rubber sold by the Dow-Corning Corporation under the tradename Silastic 595 silicone rubber in the form of a gum can be separately formed by molding techniques such as injection or transfer molding.

The transparent silicone rubber, compounded with a minor amount of a filler, such as fumed silica, to render it translucent, can be introduced into a heated light-pipe mold (not shown), and maintained at an elevated temperature, such as 320° C. The molded silicon rubber gum can be formed and partially cured (mold cured) within a period of 60–75 seconds whereupon it is ejected from the mold as a light-pipe preform. These preformed and partially cured light-pipes 10 are thereafter post-cured out of the mold for about 4 hours at about 200° C. The present inventors have surprisingly discovered that the post-curing step imparts significantly greater propensity of the preformed light-pipes 10 to bond or vulcanize to the subsequently molded material of the composite. This result is surprising in view of the fact that the preferred subsequently molded material is also silicone rubber.

The steps of forming a composite product for use as a key will now be described in connection with FIG. 4. A preformed light-pipe 10 of silicone rubber, formed and post-cured by the above-mentioned technique having a height X is placed in a depression 204 in mold part 302 and the mold parts 300, 302 closed, as illustrated in FIG. 4. It is important that the height of the mold cavity Y (including depression 204) in relation to the height X of the preformed light-pipe 10 satisfy the relationship that X is greater than Y such that the silicone rubber light-pipe 10 is subject to compression exerted by the closed mold parts 300, 302. The dimensions of X and Y can be predetermined such that the degree of compression of the preformed light-pipe 10 will be sufficient to maintain the preform 10 positioned within the mold cavity during injection of the flowable silicone rubber key forming material 12. Although light-pipe 10 can be held under compression in the absence of any depression 204 it is preferred to use depression 204 to assist in holding light-pipe 10 in place during the molding cycle. Light-pipe 10 can be cut off flush with the bottom of key 12 at a later time to produce the composite product illustrated in FIG. 1.

Figure 5:
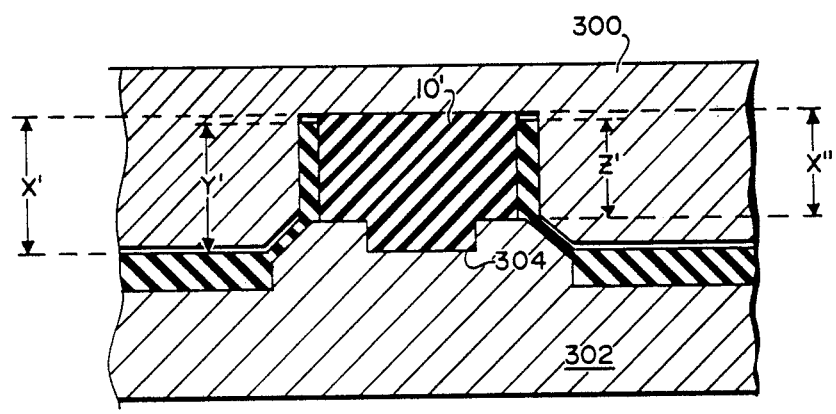
FIG. 5 is a sectional view through an injection mold containing a preform and moldable material in another embodiment of the invention.

In a particularly preferred embodiment of the invention, illustrated in FIG. 5, one mold part may be provided with a depression 304 into which a preformed light-pipe 10' may be inserted. The depression 304 facilitates the placement of the light-pipe 10' in the mold cavity. It is important to note that the height X' of light-pipe 10' must be greater than the height Y' of the mold cavity including depression 304 such that the top surface of light-pipe 10' is held under compression with the wall of mold part 300. The compression should be sufficient to prevent the displacement of light-pipe 10' during the introduction of the flowable elastomer in the mold cavity. It should be appreciated that although only part of the periphery of light-pipe 10' is illustrated as being the depression, the entire periphery of light-pipe 10' can be encompassed by the depression. Further, in the embodiment illustrated, both X' and X" are greater than the corresponding dimensions Y' and Z' of the mold cavity.

A preferred silicone rubber key forming material 12 is the same Silastic 595 silicone rubber identified in connection with the preformed light-pipe 10 except that it contains a filler or pigment so as to render it opaque to the passage of light. Suitable fillers and pigments are known to those skilled in the art, such as silica or $TiO_2$. The point of introduction of the flowable key forming silicone rubber material 12 is selected so as to minimize displacement of the preformed light-pipe 10 or 10' as well as to locate the sprue in a location where it does not detract from the functioning or appearance of key 112. It has been found preferable to inject the flowable material from a location such that it enters in the vicinity of rubber key extension 26 through the mold cavity, flowing about rubber light-pipe 10 and exiting through rubber key extension 24 as shown in Figure 4. However for different configurations of mold cavity and preformed translucent or transparent elements the location of the injection site will be chosen so as to minimize displacement of the preformed translucent or transparent elements. It should also be borne in mind that the terms height, width, and length are relative and may be used interchangeably for purposes of the present specification and claims. It is only important that at least one dimension X or X' of the preformed light-pipe 10 or 10' exceed the dimension Y or Y' of the closed mold cavity.

The present inventors are surprised that post-curing of the preformed silicone rubber improves bonding of the preform to the flowable opaque silicone rubber material. By post-curing the silicone rubber preform the present inventors think that there is no "out-gassing" from the preform which would interfere with the bond of the flowable silicone rubber. If a partially cured preform is utilized in the present process the bonding of the preform to the flowable material is noticably reduced as compared to the use of a post-cured preformed silicone rubber light-pipe 10.

In another embodiment of the invention the present inventors suitably select the dimensions of a preformed element containing a pigment or filler imparting color to the preform and the dimensions of the mold such that the preform, upon heating, will expand into contact with the heated mold walls with sufficient force so as not to be displaced by the subsequent introduction of flowable material of a different color. By such a technique applicants have been able to produce composite products having differing properties, i.e., multi-color or multi-hardness properties wherein flash or skin-forming of the flowable material over the surfaces of the preform in contact with the mold walls can be successfully avoided.

Figure 6:
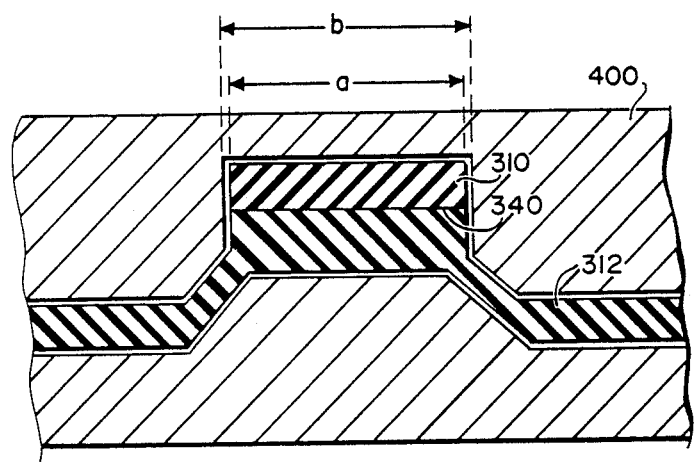
FIG. 6 illustrates an additional embodiment of the invention where a preformed element and moldable material are contained in a mold shown in a side section view.

A description of this embodiment will be readily understood with reference to FIG. 6. In FIG. 6, the preformed element 310 has a length a and the cavity portion of mold 400 has a dimension b such that $a \leq b$. However, upon heating of element 310 by the mold 400, the preformed element 310 expands by an amount $\Delta a$ such that the expression $a + \Delta a > b$ is satisfied. This expansion brings the preformed element 310 into firm contact with the cavity walls in mold element 400 so as to prevent the subsequently flowable material 312 from penetrating between the preformed element 310 and the cavity walls. In a particularly preferred embodiment both the length and width (not shown) of the preformed element 310 are dimensioned so that, upon expansion, the preformed element 310 is tightly in contact with the entire periphery of the walls of the mold cavity so as to prevent the flow of flowable material 312 beyond the face of preformed element 310 as shown in FIG. 6.

The technique of this embodiment, like those of the foregoing embodiments, produces a vulcanized bond between the preformed and flowable material that is achieved without the use of primers, mechanical interlocks or fasteners on the preform. The prior art requirements of priming the preform or use or an intermediate compatibility improving layer can be completely dispensed with. Thus the present invention provides novel composite products having improved adhesion of the various elements of the composite without requiring the cumbersome and expensive fabricating steps employed by the prior art.

Modifications of this invention by the substitution of equivalents will be obvious to those having ordinary skill in the art.

What is claimed is:

1. A method of manufacturing an integrally molded composite comprising the steps of:
   (a) placing a preformed elastomer in a mold cavity;
   (b) compressing the preformed elastomer between opposing wall portions of the mold cavity;
   (c) flowing an elastomer into the mold cavity and about the preformed elastomer under pressure such that the preformed elastomer is not displaced from its position in the mold.

2. The process of claim 1, wherein the preformed elastomer is formed by shaping silicone rubber and post-curing it for about 4 hours at about 200° C.

3. The process of claim 1, wherein the placing step comprises placing the preformed elastomer within a depression in the mold cavity.

4. The process of claim 3, wherein the elastomer which is flowed into the mold cavity is an opaque silicone rubber.

5. The process of claim 1, wherein the preformed elastomer is a light transmitting silicone rubber.

6. The process of claim 5, wherein the elastomer which is flowed into the mold cavity is an opaque silicone rubber.

7. A process of forming an integrally molded composite comprising the steps of:
   (a) placing a preformed elastomer into a heated mold cavity;
   (b) allowing the preformed elastomer to expand into a sealing contact with the mold walls;
   (c) flowing an elastomer into the mold cavity under pressure such that the preformed elastomer is not displaced from its contact with the mold walls.

8. The process of claim 7, wherein the preformed elastomer differs in at least one property from the flowable elastomer.

9. The process of claim 7, wherein the preformed elastomer differs in color from the flowable elastomer.

10. The process of claim 9, wherein the elastomers are silicone rubber.

11. The process of claim 7, wherein the preformed elastomer is fully cured prior to introducing the flowable elastomer into the mold cavity.

12. A composite product comprising a first elastomer bonded directly to a second elastomer formed by
   (a) shaping and post-curing a first elastomer;
   (b) placing said first elastomer at least partially in compression;
   (c) flowing a second elastomer into contact with the post-cured first elastomer; and
   (d) forming a vulcanized bond directly between the elastomers.

13. The composite product of claim 12, wherein said elastomers are comprised of the same material.

14. The composite product of claim 13, wherein the material is silicon rubber.

15. The composite product of claim 12, wherein said first elastomer is translucent.

16. The composite product of claim 12, wherein said first elastomer is transparent.

17. The composite product of claim 12, wherein said first elastomer is post-cured for about 4 hours at about 200° C.

18. The composite product of claim 12, wherein said first elastomer is a light transmittable elastomer and said second elastomer is an opaque elastomer, said opaque elastomer is defined as an elastomer having a lower light transmissivity than said light transmittable elastomer.

19. A composite product formed by flowing an elastomer directly onto a fully vulcanized preform, said preform at least partially in compression.

20. The composite product of claim 19, wherein the preform is of a color different than that of the elastomer.

21. The composite product of claim 19, wherein the preform is of light transmittable material and the elastomer is opaque.

22. The composite product of claim 19, wherein the fully vulcanized preform comprises silicone rubber which has been post-cured, and the elastomer is silicone rubber.

23. The composite product of claim 22, wherein said fully vulcanbized preform has been post-cured for about 4 hours at about 200° C.

24. The composite product of claim 19 wherein said flowing step includes flowing said elastomer under pressure directly onto said fully vulcanized preform.

* * * * *